WILLIAM NASON JORDAN, OF CAMBRIDGE, ASSIGNOR TO JOHN A. BALDWIN AND GEORGE R. WATERMAN, OF BOSTON, MASSACHUSETTS.

Letters Patent No. 91,751, dated June 22, 1869.

IMPROVED MEDICAL COMPOUND.

The Schedule referred to in these Letters Patent and making part of the same.

*To whom it may concern:*

Be it known that I, WILLIAM NASON JORDAN, of Cambridge, in the county of Middlesex, and Commonwealth of Massachusetts, have invented a new and useful composition of matter for the cure of all diseases of the urinary organs, in either male or female—whites, leucorrhœa, gravel, involuntary emissions, diseases of the spine and kidneys, &c.; and I do declare that the following is a full, clear, and exact description thereof.

The nature of my invention consists in combining the following ingredients, in the proportions here specified, viz:

Ferri et potassæ tartras, 201.6 grains
Borax, 230.4 grains.
Chloride of gold, 1.65 grains.
Fluid extract of sumach, 576 grains.
Fluid extract of rhatany, 201.6 grains.
Fluid extract of burdock, 172.8 grains.
Chloride of sodium, 70 grains.
Sugar, 6012.25 grains.
Flour, 280 grains.
Mucilage, 70 grains.

The above proportions make one pound avoirdupois of dry, solid compound.

This compound is flavored with a minute quantity of oil of checkerberry, the same being combined in the form of a wafer or lozenge, which, being put up in neat and convenient boxes, is readily carried upon the person, and at any time taken without difficulty or discovery, being pleasant to the taste, specific and radical in its effects, and perfectly harmless to the system.

What I claim as my invention, and desire to secure by Letters Patent, is—

The compound or medicine composed of the above ingredients, in the proportions above indicated.

WM. NASON JORDAN.

Witnesses:
 ELLIS L. MOTTE,
 JOHN W. BUTTERFIELD.